US012640556B2

(12) United States Patent
Kim et al.

(10) Patent No.: US 12,640,556 B2
(45) Date of Patent: May 26, 2026

(54) PROTECTION METHOD AND PROTECTION SYSTEM OF SHIP'S POWER DISTRIBUTION SYSTEM

(71) Applicants: HD Hyundai Electric Co., Ltd., Seongnam-si (KR); HD Hyundai Heavy Industries Co., Ltd., Ulsan (KR)

(72) Inventors: Joon Ho Kim, Seoul (KR); Seong Il Kim, Seoul (KR); Duck Su Lee, Seoul (KR); Jeong Hyeok Heo, Seoul (KR); Cheol Woo Song, Ulsan (KR); Dong Gu Lee, Seoul (KR); Sung Man Kim, Seoul (KR)

(73) Assignees: HD Hyundai Electric Co., Ltd., Seongnam-si (KR); HD Hyundai Heavy Industries Co., Ltd., Ulsan (KR)

( * ) Notice: Subject to any disclaimer, the term of this patent is extended or adjusted under 35 U.S.C. 154(b) by 127 days.

(21) Appl. No.: 18/323,755

(22) Filed: May 25, 2023

(65) Prior Publication Data

US 2023/0387679 A1    Nov. 30, 2023

(30) Foreign Application Priority Data

May 30, 2022    (KR) ........................ 10-2022-0066170

(51) Int. Cl.
  H02H 3/08      (2006.01)
  B60R 16/03     (2006.01)
          (Continued)
(52) U.S. Cl.
  CPC .............. H02H 7/22 (2013.01); B60R 16/03 (2013.01); H02H 3/05 (2013.01); H02H 3/08 (2013.01); H02H 7/261 (2013.01)

(58) Field of Classification Search
CPC .. H02H 7/22; H02H 3/08; H02H 3/05; H02H 7/261; B60R 16/03
          (Continued)

(56)          References Cited

U.S. PATENT DOCUMENTS

| 3,845,357 A | 10/1974 | Hagberg |
| 9,083,177 B2 | 7/2015 | Andersen et al. |
          (Continued)

FOREIGN PATENT DOCUMENTS

| EP | 0577339 A1 | 1/1994 |
| JP | 2013223424 A | 10/2013 |
          (Continued)

OTHER PUBLICATIONS

European Search Report for corresponding Application No. 23176135. 4, dated Dec. 4, 2023, 7 pages.
          (Continued)

*Primary Examiner* — Crystal L Hammond
*Assistant Examiner* — Lucy M Thomas
(74) *Attorney, Agent, or Firm* — Dority & Manning, PA

(57)          ABSTRACT

A protection system of ship's power distribution system, when a fault occurs in the feeder preset to be in charge of the third circuit breaker module, the relay of the third circuit breaker module trips the circuit breaker based on a magnitude and a direction of a fault current, and to transmit a power distribution maintenance signal to the relay of the second circuit breaker module. When a fault occurs in the switchboard preset to be in charge of the second circuit breaker module, the relays of the second and third circuit breaker modules trip the circuit breaker based on a magnitude and a direction of a fault current and the relay of the second circuit breaker module transmit a power distribution
          (Continued)

maintenance signal to the relay of the third circuit breaker module preset based on the magnitude and direction of the fault current.

7 Claims, 3 Drawing Sheets

(51) Int. Cl.
    *H02H 3/05*           (2006.01)
    *H02H 7/22*           (2006.01)
    *H02H 7/26*           (2006.01)
    *H02H 9/02*           (2006.01)
(58) Field of Classification Search
    USPC .......................................... 361/93.1, 42, 64
    See application file for complete search history.

(56)            References Cited

U.S. PATENT DOCUMENTS 10,644,498 B2 *   5/2020   Louco ................ G05B 23/0291
  2004/0233598 A1   11/2004   Yamada et al.

2013/0215543 A1     8/2013   Hoeven
2013/0270902 A1   10/2013   Andersen et al.
2013/0271878 A1 *  10/2013   Maddali .................... H02P 9/10
                                 361/20
2013/0271879 A1   10/2013   Andersen et al.
2019/0273376 A1    9/2019   Lindtjørn

FOREIGN PATENT DOCUMENTS

JP         2013540416 A    10/2013
KR      20130091348      8/2013
KR      20130117701     10/2013
KR      20190051077      5/2019
WO   WO2012052325 A1    4/2012

OTHER PUBLICATIONS

Japanese Office Action for corresponding Application No. 2023-088877, dated Jun. 25, 2024, 4 pages.

* cited by examiner

PROTECTION METHOD AND PROTECTION SYSTEM OF SHIP'S POWER DISTRIBUTION SYSTEM

CROSS-REFERENCE TO RELATED APPLICATION(S)

This application claims benefit of priority to Korean Patent Application No. 10-2022-0066170 filed on May 30, 2022 in the Korean Intellectual Property Office, the disclosure of which is incorporated herein by reference in its entirety.

BACKGROUND

1. Field

The present disclosure relates to a system and method for protecting a power distribution system of a ship.

2. Description of Related Art

Many power-dependent components are commonly used in ships. For example, a dynamic positioning (DP) ship, a ship equipped with a system for maintaining or controlling a position and heading of the ship using a thruster, is used to perform an operation such as a shuttle tanker, subsea drilling, or the like. When position loss occurs during operation, an accident with high risk may occur.

Quick isolation of the affected portion of the system while maintaining normal operation elsewhere. Reduction of the short-circuit current to minimize damage to the system, its components, and the utilization equipment it supplies. The objective of system protection and coordination is to minimize damage to the system and its components, and limit the extent and duration of any service interruption that may occur in any part of the system.

Related Art 1: Korean Patent Application Publication No. 10-2019-0051077

SUMMARY

Aspects of the present disclosure provide a system and method for protecting a power distribution system of a ship having a protection function capable of rapidly and accurately blocking only a fault position in a selective manner when a disturbance occurs in a power system of the ship.

According to an aspect of the present disclosure, there is provided a protection system of a ship's power distribution system comprising three circuit breaker modules. The first module includes a circuit breaker located between a generator and a switchboard to block transmitted power, and a relay configured to control the operation of the circuit breaker. The second module includes a circuit breaker located between switchboards to block transmitted power and a relay configured to control the operation of the circuit breaker. The third module includes a circuit breaker located at a feeder to block transmitted power, and a relay configured to control the operation of the circuit breaker. The relays of the second and third circuit breaker modules may have the same delay time. In the event of a fault in the feeder, the relay of the third circuit breaker module may be configured to trip the circuit breaker based on the magnitude and direction of the fault current and transmit a power distribution maintenance signal to the relay of the second circuit breaker module by the proposed block logic. Similarly, in the event of a fault in the switchboard, the relays of the second and third circuit breaker modules connected to the switchboard may be configured to trip the circuit breaker based on the magnitude and direction of the fault current, and the relay of the second circuit breaker module may be configured to transmit a power distribution maintenance signal to the relay of the third circuit breaker module preset based on the magnitude and direction of the fault current.

According to another aspect of the present disclosure, there is provided a protection method of a ship's power distribution system, the protection method including a first operation in which a first circuit breaker module having a circuit breaker disposed between a generator and a switchboard to block transmitted power and a relay configured to control an operation of the circuit breaker, a second circuit breaker module having a circuit breaker disposed on the switchboard to block transmitted power and a relay configured to control an operation of the circuit breaker, and a third circuit breaker module having a circuit breaker disposed between the switchboard and a feeder to block transmitted power and a relay configured to control an operation of the circuit breaker, relays of the first circuit breaker module, the second circuit breaker module, and the third circuit breaker module communicate with each other to identify a magnitude and a direction of a fault current when a fault occurs in the power distribution system of the ship, a second operation in which the circuit breaker module is instantaneously tripped when the identified magnitude and direction of the fault current correspond to a preset differential protection fault, a third operation in which the relay of the third circuit breaker module trips the circuit breaker and transmits a power distribution maintenance signal to the relay of the second circuit breaker module when the identified magnitude and direction of the fault current do not correspond to the differential protection fault and correspond to a preset feeder fault, a fourth operation in which a fault position is identified based on the identified magnitude and direction of the fault current when the identified magnitude and direction of the fault current do not correspond to the differential protection fault and the feeder fault, the relays of the second and third circuit breaker modules connected to the switchboard in which a fault occurs are configured to trip the circuit breaker when the fault occurs in the switchboard preset to be in charge of the second circuit breaker module, and the relay of the second circuit breaker module is configured to transmit a power distribution maintenance signal to the relay of the third circuit breaker module preset based on the magnitude and direction of the fault current, and a fifth operation in which the circuit breaker of the first circuit breaker module of the switchboard in which the fault occurs is tripped.

According to example embodiments of the present disclosure, only a fault section in a power distribution system of a ship may be selectively blocked to minimize a range and damage of a fault, and a fault may be rapidly blocked with respect to a disturbance to improve safety of a ship power system.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, preferred example embodiments will be described in detail so that those skilled in the art could easily carry out example embodiments of the present disclosure with reference to the accompanying drawings.

Figure 1:
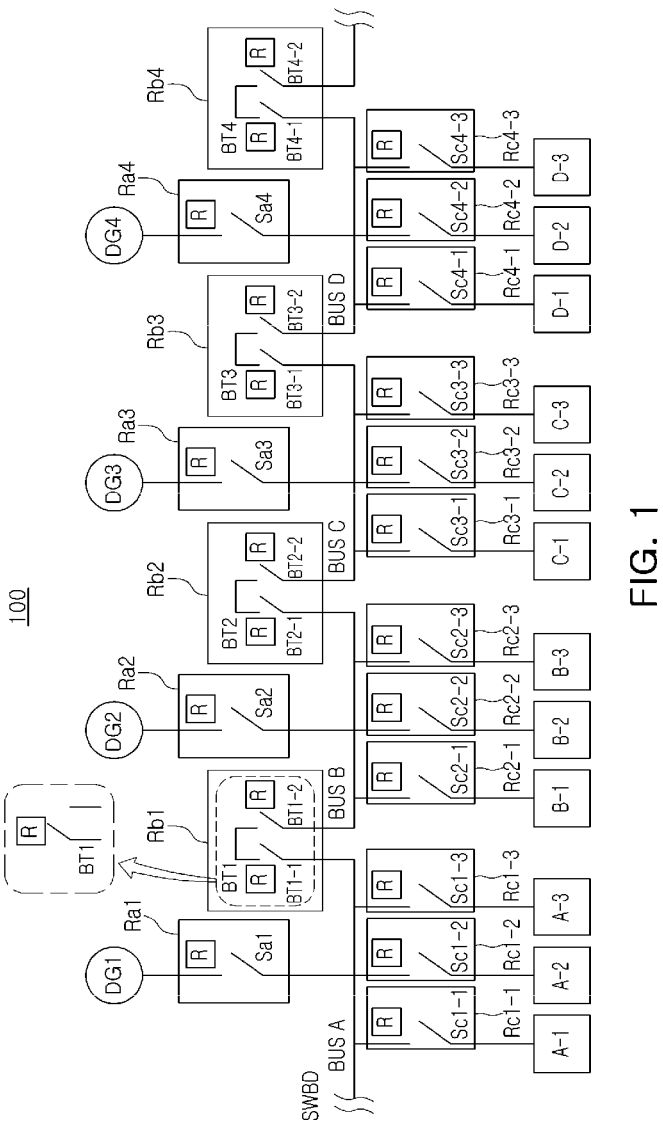
FIG. 1 is a schematic configuration diagram illustrating an example of a system for protecting a power distribution system of a ship according to an example embodiment of the present disclosure.
Figure 2:
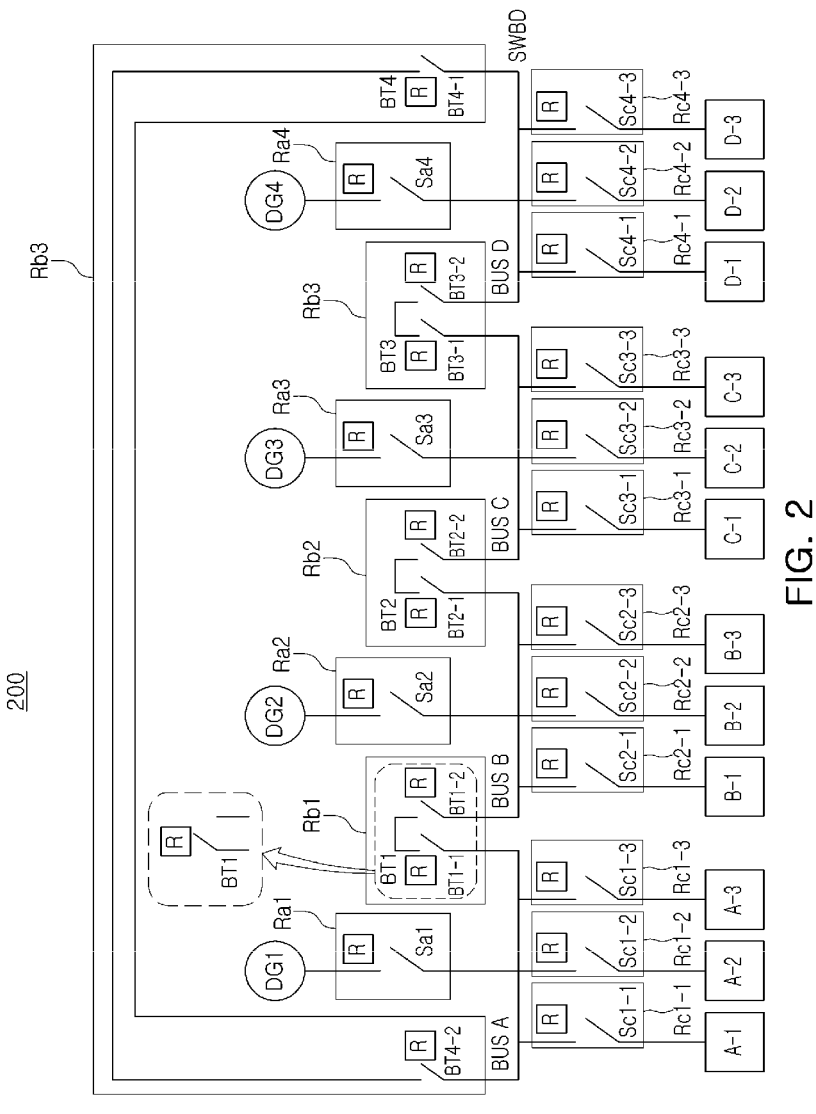
FIG. 2 is a schematic configuration diagram illustrating another example of a system of protecting a system for protecting a power distribution system of a ship according to an example embodiment of the present disclosure.

FIG. 1 is a schematic configuration diagram illustrating an example of a system for protecting a power distribution system of a ship according to an example embodiment of the present disclosure. FIG. 2 is a schematic configuration diagram illustrating another example of a system of protecting a system for protecting a power distribution system of a ship according to an example embodiment of the present disclosure.

Referring to FIG. 1, an example 100 of a system for protecting a power distribution system of a ship according to an example embodiment of the present disclosure may include a plurality of generators G1, G2, G3, and G4, a plurality of feeders A-1, A-2, A-3, B-1, B-2, B-3, C-1, C-2, C-3, D-1, D-2, and D-3 receiving power from a corresponding generator among the plurality of generators G1, G2, G3, and G4, a plurality of buses BUS A, BUS B, BUS C, and BUS D of a switchboard distributing power to the plurality of generators G1, G2, G3, and G4 and the plurality of feeders A-1, A-2, A-3, B-1, B-2, B-3, C-1, C-2, C-3, D-1, D-2, and D-3 receiving power from the corresponding generator among the plurality of generators G1, G2, G3, and G4. In addition, the example 100 may include a plurality of first circuit breaker modules Ra1, Ra2, Ra3, and Ra4 respectively connected between the plurality of generators G1, G2, G3, and G4 and the plurality of buses BUS A, BUS B, BUS C, and BUS D, a plurality of second circuit breaker modules Rb1, Rb2, Rb3, and Rb4 connected between the plurality of buses BUS A, BUS B, BUS C, and BUS D, and a plurality of third circuit breaker modules Rc1-1, Rc1-2, Rc1-3, Rc2-1, Rc2-2, Rc2-3, Rc3-1, Rc3-2, Rc3-3, Rc4-1, Rc4-2, and Rc4-3 connected between the plurality of feeders A-1, A-2, A-3, B-1, B-2, B-3, C-1, C-2, C-3, D-1, D-2, and D-3 receiving power from a corresponding bus among the plurality of buses BUS A, BUS B, BUS C, and BUS D.

The plurality of first circuit breaker modules Ra1, Ra2, Ra3, and Ra4, the plurality of second circuit breaker modules Rb1, Rb2, Rb3, and Rb4, and the plurality of third circuit breaker modules Rc1-1, Rc1-2, Rc1-3, Rc2-1, Rc2-2, Rc2-3, Rc3-1, Rc3-2, Rc3-3, Rc4-1, Rc4-2, and Rc4-3 may respectively include a relay R, circuit breakers Sa1, Sa2, Sa3, Sa4, Sc1-1, Sc1-2, Sc1-3, Sc2-1, Sc2-2, Sc2-3, Sc3-1, Sc3-2, Sc3-3, Sc4-1, Sc4-2, and Sc4-3, or bus ties BT 1-1, BT 1-2, BT 2-1, BT 2-2, BT 3-1, BT 3-2, BT 4-1, and BT 4-2. The relays R may respectively communicate with each other (not illustrated) to identify a position in which a fault occurs and a direction of a fault current. The circuit breakers Sa1, Sa2, Sa3, Sa4, Sc1-1, Sc1-2, Sc1-3, Sc2-1, Sc2-2, Sc2-3, Sc3-1, Sc3-2, Sc3-3, Sc4-1, Sc4-2, and Sc4-3 or the bus ties BT 1-1, BT 1-2, BT 2-1, BT 2-2, BT 3-1, BT 3-2, BT 4-1, and BT 4-2 may block or maintain a power transmission path according to the control of a corresponding relay R.

Each of the relays R may be consist of hardware, a combination of hardware and software, software, or running software, and may include at least one processing unit and memory. Here, the processing unit may include, for example, at least one of a central processing unit (CPU), a graphics processing unit (GPU), a microprocessor, an application specific integrated circuit (ASIC), a field programmable gate array (FPGA), and the like, and may have a plurality of cores. The memory may be a volatile memory (for example, RAM or the like), a non-volatile memory (for example, ROM, flash memory, or the like), or a combination thereof. In addition, each of the relays R may include a communication connection unit enabling the relays R communication with each other. Here, the communication connection unit may be configured in various form, such as a modem, a network interface card (NIC), an integrated network interface, a radio frequency transmitter/receiver, an infrared port, USB connection, and the like.

In addition, as illustrated in another example 200 of a system of protecting a power distribution system of a ship according to an example embodiment of the present disclosure illustrated in FIG. 2, the system may have a ring configuration in which bus ties BT 4-1 and BT 4-2 are formed between a fore-end bus BUS A and a back-end bus BUS D.

FIGS. 1 and 2 illustrate first to fourth generators G1, G2, G3, and G4 and buses BUS A, BUS B, BUS C, and BUS D, but the present disclosure is not limited thereto. In addition, in FIGS. 1 and 2, a bus tie of second circuit breaker module Rb1, Rb2, Rb3, and Rb4 may consist of one switch BT1 and a relay R or two switches BT1-1 and BT1-2 and a relay R. FIGS. 1 and 2 illustrate that one bus tie may consist of one switch BT1 and a relay R or two switches BT1-1 and BT1-2 and a relay R, but it should be noted that the above-described configuration is also applicable to remaining bus ties BT2, BT3, and BT4.

Figure 3:
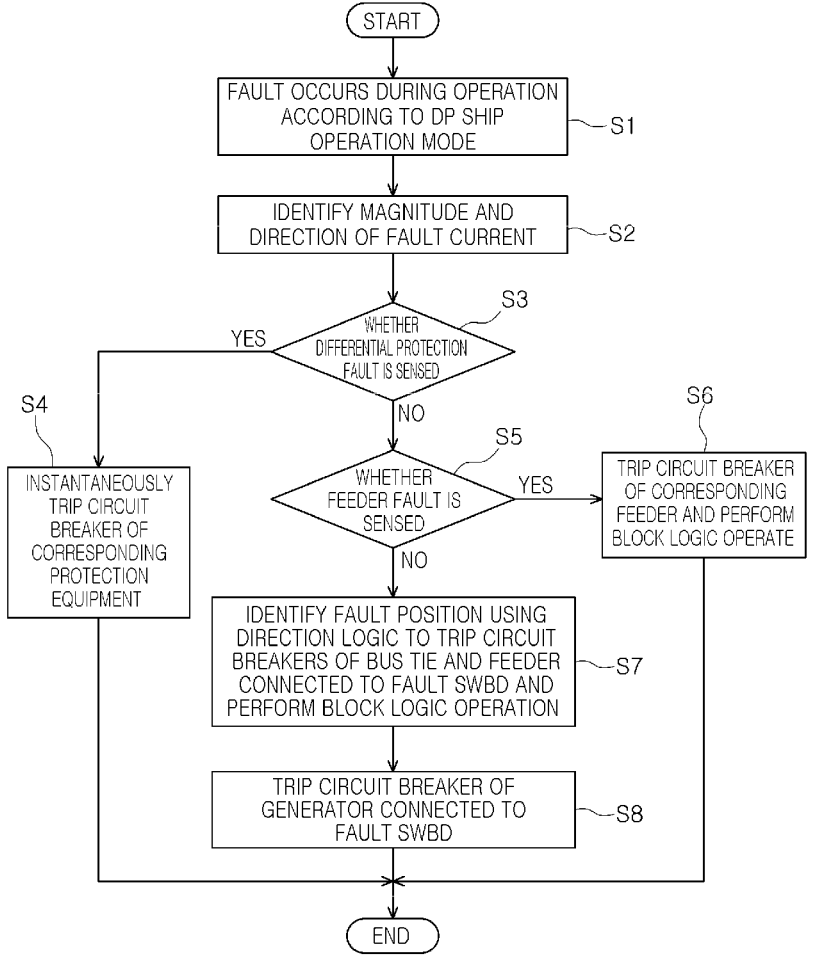
FIG. 3 is a flowchart illustrating a schematic operation of a method for protecting a power distribution system of a ship according to an example embodiment of the present disclosure.

FIG. 3 is a flowchart illustrating a schematic operation of a method for protecting a power distribution system of a ship according to an example embodiment of the present disclosure.

Referring to FIG. 3 together with FIGS. 1 and 2, first, when a fault occurs during operation, a plurality of first circuit breaker modules Ra1, Ra2, Ra3, and Ra4 respectively connected between a plurality of generators G1, G2, G3, and G4 and corresponding buses BUS A, BUS B, BUS C, and BUS D of a switchboard SWBD, a plurality second circuit breaker module Rb1, Rb2, Rb3, and Rb4 connected between the plurality of buses BUS A, BUS B, BUS C, and BUS D of the switchboard SWBD, and a plurality of third circuit breaker modules Rc1, Rc2, Rc3, and Rc4 connected between a plurality of feeders A-1, A-2, A-3, B-1, B-2, B-3, C-1, C-2, C-3, D-1, D-2, and D-3 receiving power from a corresponding bus among the plurality of buses BUS A, BUS B, BUS C, and BUS D of the switchboard SWBD, relays of the plurality of first circuit breaker modules Ra1, Ra2, Ra3, and Ra4, the plurality second circuit breaker module Rb1, Rb2, Rb3, and Rb4, and the plurality of third circuit breaker modules Rc1-1, Rc1-2, Rc1-3, Rc2-1, Rc2-2, Rc2-3, Rc3-1, Rc3-2, Rc3-3, Rc4-1, Rc4-2, and Rc4-3 communicate with each other to identify a magnitude and a direction of a fault current (first operation).

When the magnitude and direction of the fault current identified by the communication between the relays of the plurality of first to third circuit breaker modules described above corresponds to a preset differential protection fault (S3), a corresponding circuit breaker module may be instantaneously tripped (S4) (second operation).

Here, differential protection may refer to identifying a fault in a protection section by a difference in current magnitude between protection devices when a fault occurs in a line or electrical facility to be protected in an electrical system, and may be a basic way to protect a generator and a transformer in general. A detailed description thereof will be omitted.

When setting an operation time of each relay of the first to third circuit breaker modules, a delay time may be set. A delay time of each relay of the second and third circuit breaker modules may be equally set, and a delay time of each relay of the first circuit breaker module may be set to be slower than a delay time of each relay of the second and third circuit breaker modules. For example, the delay time of each relay of the second and third circuit breaker modules may be set to 100 ms, and the delay time of each relay of the first circuit breaker module may be set to 300 ms. The relay time of the second circuit breaker module may be set to 100 ms in order to be equal to the delay time of each relay of the third circuit breaker module to, thereby reducing an existing cooperation time (200 ms) between a load and a bus tie. A circuit breaker tripping time may be reduced when a fault occurs, the fault may be blocked more rapidly, improving transient stability of the electrical system.

Conversely, instantaneous tripping may refer to tripping a fault current without delay, and a range of time during which the instantaneous tripping is performed may be different for each relay maker, but may be set to approximately 30 to 50 ms.

When the identified magnitude and direction of the fault current do not correspond to the differential protection fault but correspond to a preset feeder fault (S5), a circuit breaker of the third circuit breaker module may be tripped, and a relay of the third circuit breaker module may transmit a power distribution maintenance signal to a relay of the second circuit breaker module (S6) (third operation).

In addition, when the identified magnitude and direction of the fault current do not correspond to the differential protection fault and the feeder fault, a fault position may be identified according to the magnitude and direction of the fault current, such that a circuit breaker of a second circuit breaker module and a circuit breaker of a third circuit breaker module of a switchboard in which a fault occurs may be tripped, and a relay of the second circuit breaker module may transmit a power distribution maintenance signal to a relay of the third circuit breaker module preset based on the magnitude and direction of the fault current (S7) (fourth operation).

Thereafter, a circuit breaker of a first circuit breaker module of the switchboard in which the fault occurs may be tripped (fifth operation).

In the above-described third and fourth operations, according to a circuit breaker tripping operation and a preset block logic operation of a corresponding circuit breaker module, a circuit breaker of a circuit breaker module that does not correspond to the fault position may be allowed not to perform a tripping operation.

The following table may be a table showing a block logic of a system and method for protecting a power distribution system of a ship according to an example embodiment of the present disclosure.

TABLE 1

| Case | Description | Event | First bus tie | Second bus tie | Third bus tie | First feeder | Second feeder | Third feeder | Fourth feeder | Notes |
|---|---|---|---|---|---|---|---|---|---|---|
| 1-1 | Closed bus system First to third bus ties: Closed | Fault in first bus | Pick up: 67R Block signal: Second feeder and first to fourth generators | Pick up: 67R Block signal: Third feeder and first to fourth generators | Pick up: 67R Block signal: Fourth feeder and first to fourth generators | Pick up: 67R Block Signal: X | Pick up: 67R Block Signal: X | Pick up: 67R Block Signal: X | Pick up: 67R Block Signal: X | In the case of an open bus system (when all bus ties are open), there is no block signal as no fault current is picked up. |
| 1-2 | | Fault in second bus | Pick up: 67F Block signal: First feeder and first to fourth generators | Pick up: 67R Block signal: Third feeder and first to fourth generators | Pick up: 67R Block signal: Fourth feeder and first to fourth generators | Pick up: 67R Block Signal: X | Pick up: 67R Block Signal: X | Pick up: 67R Block Signal: X | Pick up: 67R Block Signal: X | |
| 1-3 | | Fault in third bus | Pick up: 67F Block signal: First feeder and first to fourth generators | Pick up: 67F Block signal: Second feeder and first to fourth generators | Pick up: 67R Block signal: Fourth feeder and first to fourth generators | Pick up: 67R Block Signal: X | Pick up: 67R Block Signal: X | Pick up: 67R Block Signal: X | Pick up: 67R Block Signal: X | |
| 1-4 | | Fault in fourth bus | Pick up: 67F Block signal: First feeder and first to fourth generators | Pick up: 67F Block signal: Second feeder and first to fourth generators | Pick up: 67F Block signal: Third feeder and first to fourth generators | Pick up: 67R Block Signal: X | Pick up: 67R Block Signal: X | Pick up: 67R Block Signal: X | Pick up: 67R Block Signal: X | |

TABLE 1-continued

| Case | Description | Event | First bus tie | Second bus tie | Third bus tie | First feeder | Second feeder | Third feeder | Fourth feeder | Notes |
|---|---|---|---|---|---|---|---|---|---|---|
| 1-5 | | Fault in first feeder | Pick up: 67R Block signal: Second feeder and first to fourth generators | Pick up: 67R Block signal: Third feeder and first to fourth generators | Pick up: 67R Block signal: Fourth feeder and first to fourth generators | Pick up: 67F Block signal: First bus tie | Pick up: 67R Block Signal: X | Pick up: 67R Block Signal: X | Pick up: 67R Block Signal: X | |
| 1-6 | | Fault in second feeder | Pick up: 67F Block signal: First feeder and first to fourth generators | Pick up: 67R Block signal: Third feeder and first to fourth generators | Pick up: 67R Block signal: Fourth and feeder first to fourth generators | Pick up: 67R Block Signal: X | Pick up: 67F Block signal: First and second bus ties | Pick up: 67R Block Signal: X | Pick up: 67R Block Signal: X | |
| 1-7 | | Fault in third feeder | Pick up: 67F Block signal: First feeder and first to fourth generators | Pick up: 67F Block signal: Second feeder and first to fourth generators | Pick up: 67R Block signal: Fourth feeder and first to fourth generators | Pick up: 67R Block Signal: X | Pick up: 67R Block Signal: X | Pick up: 67F Block signal: Second and third bus ties | Pick up: 67R Block Signal: X | |
| 1-8 | | Fault in fourth feeder | Pick up: 67F Block signal: First feeder and first to fourth generators | Pick up: 67F Block signal: Second feeder and first to fourth generators | Pick up: 67F Block signal: Third feeder and first to fourth generators | Pick up: 67R Block Signal: X | Pick up: 67R Block Signal: X | Pick up: 67R Block Signal: X | Pick up: 67F Block signal: Third bus tie | |
| 2-1 | Two split system Second bus tie: Open First and Third bus ties: Closed | Fault in first bus | Pick up: 67R Block signal: Second feeder and first to fourth generators | — | — | Pick up: 67R Block Signal: X | Pick up: 67R Block Signal: X | — | — | |
| 2-2 | | Fault in second bus | Pick up: 67F Block signal: First feeder and first to fourth generators | — | — | Pick up: 67R Block Signal X | Pick up: 67R Block Signal: X | — | — | |
| 2-3 | | Fault in third bus | — | — | Pick up: 67R Block signal: Fourth feeder and first to fourth generators | — | — | Pick up: 67R Block Signal: X | Pick up: 67R Block Signal: X | |
| 2-4 | | Fault in fourth bus | — | — | Pick up: 67F Block signal: Third feeder and first to fourth generators | — | — | Pick up: 67R Block Signal: X | Pick up: 67R Block Signal: X | |
| 2-5 | | Fault in first feeder | Pick up: 67R Block signal: Second feeder and first to fourth generators | — | — | Pick up: 67F Block signal: First bus tie | Pick up: 67R Block Signal: X | — | — | |

TABLE 1-continued

| Case | Description | Event | First bus tie | Second bus tie | Third bus tie | First feeder | Second feeder | Third feeder | Fourth feeder | Notes |
|------|-------------|-------|---------------|----------------|---------------|--------------|---------------|--------------|---------------|-------|
| 2-6 | | Fault in second feeder | Pick up: 67F Block signal: First feeder and first to fourth generators | — | — | Pick up: 67R Block Signal: X | Pick up: 67F Block signal: First bus tie and second bus tie open | — | — | |
| 2-7 | | Fault in third feeder | — | — | Pick up: 67R Block signal: Fourth feeder and first to fourth generators | — | — | Pick up: 67F Block signal: Third bus tie and second bus tie open | Pick up: 67R Block Signal: X | |
| 2-8 | | Fault in fourth feeder | — | — | Pick up: 67F Block signal: Third feeder and first to fourth generators | — | — | Pick up: 67R Block Signal: X | Pick up: 67F Block signal: Third bus tie | |
| 3-1 | Two split system First bus tie: Open Second and third bus ties: Closed | Fault in first bus | — | — | — | Pick up: 67R Block Signal: X | — | — | — | |
| 3-2 | | Fault in second bus | — | Pick up: 67R Block signal: Third feeder and first to fourth generators | Pick up: 67R Block signal: Fourth feeder and first to fourth generators | — | Pick up: 67R Block Signal: X | Pick up: 67R Block Signal: X | Pick up: 67R Block Signal: X | |
| 3-3 | | Fault in third bus | — | Pick up: 67F Block signal: Second feeder and first to fourth generators | Pick up: 67R Block signal: Fourth feeder and first to fourth generators | — | Pick up: 67R Block Signal: X | Pick up: 67R Block Signal: X | Pick up: 67R Block Signal: X | |
| 3-4 | | Fault in fourth bus | — | Pick up: 67F Block signal: Second feeder and first to fourth generators | Pick up: 67F Block signal: Third feeder and first to fourth generators | — | Pick up: 67R Block Signal: X | Pick up: 67R Block Signal: X | Pick up: 67R Block Signal: X | |
| 3-5 | | Fault in first feeder | — | — | — | Pick up: 67R Block Signal: X First bus tie open | — | — | — | |
| 3-6 | | Fault in second feeder | — | Pick up: 67R Block signal: Third feeder and first to fourth generators | Pick up: 67R Block signal: Fourth feeder and first to fourth generators | — | Pick up: 67F Block signal: First bus tie and second bus tie open | Pick up: 67R Block Signal: X | Pick up: 67R Block Signal: X | |

TABLE 1-continued

| Case | Description | Event | First bus tie | Second bus tie | Third bus tie | First feeder | Second feeder | Third feeder | Fourth feeder | Notes |
|---|---|---|---|---|---|---|---|---|---|---|
| 3-7 | | Fault in third feeder | — | Pick up: 67F Block signal: Second feeder and first to fourth generators | Pick up: 67R Block signal: Fourth feeder and first to fourth generators | — | Pick up: 67R Block Signal: X | Pick up: 67F Block signal: Third bus tie and second bus tie open | Pick up: 67R Block Signal: X | |
| 3-8 | | Fault in fourth feeder | — | Pick up: 67F Block signal: Second feeder and first to fourth generators | Pick up: 67F Block signal: Third feeder and first to fourth generators | — | Pick up: 67R Block Signal: X | Pick up: 67R Block Signal: X | Pick up: 67F Block signal: Third bus tie | |
| | Block for each bus tie and feeder protection element | | 67R: Second feeder 67F: First feeder | 67R: Third feeder 67F: Second feeder | 67R: Fourth feeder 67F: Third feeder | 67R: X 67F: First bus tie | 67R: X 67F: First and second bus ties | 67R: X 67F: Second and third bus ties | 67R: X 67F: Third bus tie | |

Referring to Table 1 together with FIG. 1 or 2, a power system (bus system) to which the system and method for protecting a power distribution system of a ship according to an example embodiment of the present disclosure are applied may be classified into a ring bus system, a closed bus system, a two split system, a three split system, and the like. In order to describe the above-described block logic, the closed bus system and the two split system will be described as an example, with reference to Table 1.

First, in the closed bus system, when a fault occurs in each of a plurality of buses (Bus A Fault, Bus B Fault, Bus C Fault, and Bus D Fault), a bus tie (for example, BT 1-1 and BT 1-2 (Bus-Tie 1), BT 2-1 and BT 2-2 (Bus-Tie 2), BT 3-1 and BT 3-2 (Bus-Tie 3)) of a plurality of buses may be open. For example, in the power system illustrated in FIGS. 1 and 2, when a fault occurs in a first bus (Bus A), a fault current may not flow to a corresponding feeder, and the fault current may flow into a place in which the fault occurs, such that relays R of breaker modules Rb1, Rb2, and Rb3 may communicate with each other to identify that the current flows into the place in which the fault occurs. A direction of the fault current may be determined depending on a direction of the fault current flowing with respect to a circuit breaker, and the direction may be arbitrarily determined. In the case of a bus tie, the direction may be determined as 67F when the fault current flows from a second bus (Bus B) to a first bus (Bus A), may be determined as 67R when the fault current flows from the first bus (Bus A) to the second bus (Bus B), may be determined as 67F when the fault current flows from a bus to a feeder, and may be determined as 67R when the fault current flows from the feeder to the bus. For example, the direction may be determined as 67F when the current flows into the first bus (Bus A) with respect to a first bus tie, and may be determined as 67R when the current flows into the second bus (Bus B) with respect to the first bus tie. Depending on selection of a user, descriptions and definitions of 67F and 67R may be changed. Each BUS-TIE breaker can operate according to an algorithm using the direction of the fault current, to determine the location of the failure and remove the failure through the algorithm.

Referring back to a case in which a fault occurs in the first bus (Bus A) in the power system illustrated in FIGS. 1 and 2, relays R of second circuit breaker modules Rb1, Rb2, and Rb3 may communicate with each other to identify current flowing into the first bus (Bus A). In first to third bus ties (Bus-Tie 1, Bus-Tie 2, and Bus-Tie 3) BT1-1, BT1-2, BT2-1, BT2-2, BT3-1, and BT3-2, the current may flow in a reverse direction. In this case, the first bus tie BT1-1 and BT1-2 may operate to block the current flowing into the first bus (Bus A). Thereafter, relays R of third circuit breaker module Rc1-1, Rc1-2, and Rc1-3 in a corresponding fault position may allow circuit breakers Sa1-1, Sa1-2, and Sa1-3 to operate, thereby blocking inflow of the current. In this case, the first bus ties BT1-1 and BT1-2 may transmit a block signal to third circuit breaker modules Rc2-1, Rc2-2 and Rc2-3 of a second feeder (Feeder B) and first circuit breaker modules Ra1, Ra2, Ra3, and Ra4 to allow circuit breakers Sc2-1, Sc2-2, and Sc2-3 of the third circuit breaker module and circuit breakers Sa1, Sa2, Sa3, and Sa4 of the first circuit breaker module not to operate (a block logic in FIG. 4). As described above, as indicated in Table 1, second circuit breaker modules BT2-1, BT2-2, BT3-1, and BT3-2 may also transmit a block signal in the same manner, thereby allowing a second circuit breaker and a third circuit breaker not to operate.

Here, first to fourth generators G1, G2, G3, and G4 may maintain a power generation operation according to the requirement that even a generator corresponding to a fault portion needs to operate (open) later than a bus tie breaker. Then, as described in connection with the fifth operation of FIG. 3, the first to fourth generators G1, G2, G3, and G4 may allow a circuit breaker Sa1 of a corresponding first circuit breaker module Ra1 to operate, thereby blocking power transmission.

As described above, even when a fault occurs in second to fourth buses (Bus B Fault, Bus C Fault, and Bus D Fault), a circuit breaker in a fault position may be allowed to operate according to a direction (67R or 67F) of a fault current, and power transmission may be maintained without allowing a circuit breaker of a circuit breaker module that does not correspond to the fault location to operate.

Next, in the two-split system, when a second bus tie (Bus-Tie 2) BT2-1 and BT2-2 is open, and first and third bus ties (Bus-Tie 1 and Bus-Tie 3) BT1-1, BT1-2, BT3-1, and BT3-3 are closed, current flowing into the first bus tie (Bus-Tie 1) BT1-1 and BT1-2 may be identified in a reverse direction (67R) by a relay R when a fault occurs in a first bus (Bus A), and the first bus tie (Bus-Tie 1) BT1-1 and BT1-2 may be tripped in order to remove the fault current. In this case, in order to block only a fault section, a block signal may be transmitted to a circuit breaker module not corresponding to a fault position, thereby maintaining power transmission without allowing a corresponding circuit breaker to operate (second feeder (Feeder B) B-1, B-2, and B-3, and first to fourth generator G1, G2, G3, and G4). When a fault occurs in a second bus (Bus B) (Bus B Fault), current flowing into the first bus tie (Bus-Tie 1) BT1-1 and BT1-2 may be identified in a forward direction (67F) by a relay R, and the first bus tie (Bus-Tie 1) BT1-1 and BT1-2 may be tripped in order to remove the fault current. In this case, in order to block only a fault section, a block signal may be transmitted to a circuit breaker module not corresponding to a fault position, thereby maintaining power transmission without allowing a corresponding circuit breaker to operate (first feeder (Feeder A) A-1, A-2, and A-3 and first to fourth generators G1, G2, G3, and G4). When a fault occurs in a third bus (Bus C) (Bus C Fault), current flowing into the third bus tie (Bus-Tie 3) BT3-1 and BT3-2 may be identified in a reverse direction (67R) by a relay R, and the third bus tie (Bus-Tie 3) BT3-1 and BT3-2 may be tripped in order to remove the fault current. In this case, in order to block only a fault section, a block signal may be transmitted to a circuit breaker module not corresponding to a fault position, thereby maintaining power transmission without allowing a corresponding circuit breaker to operate (fourth feeder (Feeder D) D-1, D-2, and D-3 and first to fourth generators G1, G2, G3, and G4). When a fault occurs in a fourth bus (Bus D) (Bus D Fault), current flowing into the third bus tie (Bus-Tie 3) BT3-1 and BT3-2 may be identified in a forward direction (67F) by a relay R, and the third bus tie (Bus-Tie 3) BT3-1 and BT3-2 may be tripped in order to remove the fault current. In this case, in order to block only a fault section, a block signal may be transmitted to a circuit breaker module not corresponding to a fault position, thereby maintaining power transmission without allowing a corresponding circuit breaker to operate (third feeder (Feeder C) C-1, C-2, and C-3 and first to fourth generators G1, G2, G3, and G4).

In addition, in the two-split system, when the first bus tie (Bus-Tie1) BT1-1 and BT1-2 is open, and the second and third bus ties (Bus-Tie2 and Bus-Tie3) BT2-1, BT2-2, BT3-1, and BT3-3 are closed, a case in which a fault occurs may be divided into a case (Bus B Fault) in which a fault occurs in the second bus (Bus B), a case (Bus C Fault) in which a fault occurs in the third bus (Bus C), and a case (Bus D Fault) in which a fault occurs in the fourth bus (Bus D). In the case (Bus B Fault) in which a fault occur in the second bus (Bus B), current flowing into the second and third bus ties (Bus-Tie 2 and Bus-Tie 3) BT2-1, BT2-2, BT3-1, and BT3-3 may be identified in a reverse direction (67R) by a relay R, and the second bus tie (Bus-Tie 2) BT2-1 and BT2-2 may be tripped to remove the fault current. In this case, relays R of second circuit breaker modules of the second and third bus ties (Bus-Tie 2 and Bus-Tie 3) BT2-1, BT2-2, BT3-1, and BT3-3 picking up a fault current may transmit a block signal in order to block only a fault section. The second bus tie (Bus-Tie 2) BT2-1 and BT2-2 may transmit a block signal to a corresponding relay of the third feeder (Feeder C) and the first to fourth generators (G1 to G4), and the third bus tie (Bus-Tie 3) BT3-1 and BT3-3 may transmit a block signal to a corresponding relay of the fourth feeder (Feeder D) and the first to fourth generators (G1 to G4).

Accordingly, when a fault occurs in the second bus (BUS B) during operation of the two-split system described above, the relays R of the second circuit breaker modules of the second and third bus ties (Bus-Tie 2 and Bus-Tie 3) BT2-1, BT2-2, BT3-1, and BT3-3 may pick up the fault current and determine a direction of a fault position as 67F or 67R, a relay element, such that the second bus tie (Bus-Tie 2) BT2-1 and BT2-2 may be tripped, and the second bus tie (Bus-Tie 2) BT2-1 and BT2-2 and the third bus tie (Bus-Tie 3) BT3-1 and BT3-3 may transmit a block signal to allow a feeder of a bus and a circuit breaker of a generator in which a fault does not occurs not to operate.

With respect to faults occurring in the third bus (BUS C) and the fourth bus (BUS D), the above-described principle may also be applicable.

When a fault occurs in the third bus (BUS C), a relay of the second bus tie (Bus-Tie2) BT2-1 and BT2-2 may pick up 67F, and a relay of the third bus tie (Bus-Tie3) BT3-1 and BT3 may pick up 67R. A direction of a fault position may be determined as 67F or 67R, a relay element, such that the second bus tie (Bus-Tie 2) BT2-1 and BT2-2 and the third bus tie (Bus-Tie 3) BT3-1 and BT3-3 may be tripped, and the relays of the second bus tie (Bus-Tie 2) BT2-1 and BT2-2 and the third bus tie (Bus-Tie 3) BT3-1 and BT3-3 may transmit a block signal to allow a feeder of a bus and a circuit breaker of a generator in which a fault does not occurs not to operate (the second bus tie (Bus-Tie 2) BT2-1 and BT2-2 may allow the second feeder (Feeder B), and the first to fourth generators (G1 to G4) not to operate, and the third bus tie (Bus-Tie 3) BT3-1 and BT3-3 may allow the fourth feeder (Feeder D) and the first to fourth generators (G1 to G4) not to operate) for maintaining the initial state of closed and not open.

The block logic defined in Table 1 above may determine whether to transmit a block signal depending on a relay function picked up by each of relays of first to third bus ties with respect to all cases in which a fault may occur. As indicated in the bottom row of Table 1, a block signal may be transmitted to the relay R of the second feeder (Feeder B) when a relay of the first bus tie (Bus-Tie 1) BT1-1 and BT1-2 picks up 67R, and the block signal may be transmitted to a relay of a third circuit breaker module of the first feeder (Feeder A) when the relay of the first bus tie (Bus-Tie 1) BT1-1 and BT1-2 picks up 67F. In addition, a block signal may be transmitted to the third feeder (Feeder C) when a relay of the second bus tie (Bus-Tie 2) BT2-1 and BT2-2 picks up 67R, and the block signal may be transmitted to a relay of a third circuit breaker module of the second feeder (Feeder B) when the relay of the second bus tie (Bus-Tie 2) BT2-1 and BT2-2 picks up 67F. Similarly, a block signal may be transmitted to the fourth feeder (Feeder D) when a relay of the third bus tie (Bus-Tie 3) BT3-1 and BT3-3 picks up 67R, and the block signal may be transmitted to a relay of a third circuit breaker module of the third feeder (Feeder C) when the relay of the third bus tie (Bus-Tie 3) BT3-1 and BT3-3 picks up 67F.

As described above, according to the present disclosure, only a circuit breaker of a fault feeder may be selectively tripped according to a direction of a fault current, thereby minimizing a fault section and damage. A block logic using a direction element may be used as described above to rapidly block a fault with respect to a disturbance during operation of a dynamic positioning closed bus system, thereby improving stability of a power system of a ship.

While example embodiments have been shown and described above, it will be apparent to those skilled in the art that modifications and variations could be made without departing from the scope of the present disclosure as defined by the appended claims.

What is claimed is:

1. A system for protecting a power distribution system of a ship, the system comprising:

a plurality of first circuit breaker modules, wherein each first circuit breaker module has a circuit breaker disposed between a generator and one of a plurality of buses of a switchboard to block transmitted power and a relay configured to control an operation of the corresponding circuit breaker of the first circuit breaker module;

a plurality of second circuit breaker modules, wherein each second circuit breaker module has a circuit breaker disposed between the plurality of buses of the switchboard to block transmitted power and a relay configured to control an operation of the corresponding circuit breaker of the second circuit breaker module; and a plurality of third circuit breaker modules, wherein each third circuit breaker module has a circuit breaker disposed between one of the plurality of buses of the switchboard and a feeder to block transmitted power and a relay configured to control an operation of the corresponding circuit breaker of the third circuit breaker module, wherein the relay of each of the plurality of second circuit breaker modules and the relay of each of the plurality of third circuit breaker modules have the same delay time, when a fault occurs in the feeder preset to be in charge of one of the plurality of third circuit breaker modules, the relay of the one of the plurality of third circuit breaker module is configured to trip the corresponding circuit breaker of the one of the third circuit breaker module based on a magnitude and a direction of a fault current, and to transmit a power distribution maintenance signal to the relay of one of the plurality of the second circuit breaker modules, and when a fault occurs in one bus of the switchboard preset to be in charge of one of the plurality of second circuit breaker modules, the relays of the second and third circuit breaker modules are configured to trip the corresponding circuit breakers of the second and third circuit breaker modules based on a magnitude and a direction of a fault current, and the relay of the second circuit breaker module is configured to transmit a power distribution maintenance signal to the relay of the third circuit breaker module preset based on the magnitude and direction of the fault current; and wherein, in case that at least one of the plurality of the buses of the switchboard fails, each of the relays of the plurality of the second circuit breaker modules transmits, in response to the bus fault and based on the direction of the fault current between the plurality of the buses of the switchboard, the power distribution maintenance signal to a relay of a third circuit breaker module connected to a bus of the switchboard that is adjacent to a reverse direction of the fault current among the plurality of buses of the switchboard, and a relay of a second circuit breaker module with an open circuit breaker does not transmit the power distribution maintenance signal to the relays of the third circuit breaker modules.

2. The system of claim 1, wherein the relays of the plurality of first circuit breaker modules, the relays of the plurality of second circuit breaker modules, and the relays of the plurality of third circuit breaker modules are configured to communicate with each other to identify a position and a direction of a fault current.

3. The system of claim 1, wherein a delay time of the relays of the plurality of first circuit breaker modules is longer than delay times of the relays of the plurality of second circuit breaker modules and the relays of the plurality of third circuit breaker modules.

4. The system of claim 1, wherein the plurality of second circuit breaker modules include at least one circuit breaker disposed between adjacent buses among a plurality of buses of the switchboard, and a relay configured to control an operation of the at least one circuit breaker for each space between the adjacent buses among the plurality of buses of the switchboard.

5. The system of claim 1, wherein the plurality of second circuit breaker modules include two circuit breakers disposed between adjacent buses among a plurality of buses of the switchboard, and two relays configured to respectively control operations of the two circuit breakers for each space between the adjacent buses among the plurality of buses of the switchboard.

6. A method for protecting a power distribution system of a ship, the method comprising:

a first operation in which each of a plurality of first circuit breaker modules having a circuit breaker disposed between a generator and one of a plurality of buses of a switchboard to block transmitted power and a relay configured to control an operation of the corresponding circuit breaker of the first circuit breaker module, each of a plurality of second circuit breaker modules having a circuit breaker disposed between one of the plurality of buses of the switchboard to block transmitted power and a relay configured to control an operation of the corresponding circuit breaker of the second circuit breaker module, and each of a plurality of third circuit breaker modules having a circuit breaker disposed between one of the plurality of buses of the switchboard and a feeder to block transmitted power and a relay configured to control an operation of the corresponding circuit breaker of the third circuit breaker module, relays of the plurality of the first circuit breaker modules, the plurality of the second circuit breaker modules, and the plurality of the third circuit breaker modules communicate with each other to identify a magnitude and a direction of a fault current when a fault occurs in the power distribution system of the ship;

a second operation in which a corresponding circuit breaker module is instantaneously tripped when the identified magnitude and direction of the fault current correspond to a preset differential protection fault;

a third operation in which the relay of one of the plurality of third circuit breaker modules trips the corresponding circuit breaker and transmits a power distribution maintenance signal to the relay of one of the plurality of the second circuit breaker modules when the identified magnitude and direction of the fault current do not correspond to the differential protection fault and correspond to a preset feeder fault;

a fourth operation in which a fault location is identified based on the identified magnitude and direction of the fault current when the identified magnitude and direction of the fault current do not correspond to the differential protection fault and the feeder fault, the relays of the second and third circuit breaker modules connected to the switchboard in which a fault occurs are configured to trip corresponding circuit breakers, when the fault occurs in the switchboard preset to be in charge of one of the plurality of the second circuit breaker modules, and the relay of the one of the plurality of the second circuit breaker modules is configured to transmit a power distribution maintenance signal to the relay of the third circuit breaker module preset based on the magnitude and direction of the fault current; and a fifth operation in which the corresponding circuit breaker of one of the plurality of the first circuit breaker modules of the switchboard in which the fault occurs is tripped;

wherein, in the first operation, the relays of the plurality of second circuit breaker modules and the relays of the plurality of third circuit breaker modules have the same delay time;

wherein, in case that at least one of the plurality of the buses of the switchboard fails, each of the relays of the plurality of second circuit breaker modules transmits, in response to the bus fault and based on the direction of the fault current between the plurality of the buses of the switchboard, the power distribution maintenance signal to a relay of a third circuit breaker module connected to a bus of the switchboard that is adjacent to a reverse direction of the fault current among the plurality of buses of the switchboard, and a relay of a second circuit breaker module with an open circuit breaker does not transmit the power distribution maintenance signal to the relays of the third circuit breaker modules.

7. The method of claim 6, wherein in the first operation, a delay time of the relay of the first circuit breaker module is set to be slower than delay times of the relay of the second circuit breaker module and the relay of the third circuit breaker module.

* * * * *